United States Patent [19]

Blackwell

[11] 4,434,263

[45] Feb. 28, 1984

[54] HYDROLYTIC STABILITY IMPROVING ADDITIVE

[75] Inventor: Jennings P. Blackwell, Bartlesville, Okla.

[73] Assignee: Phillips Petroleum Company, Bartlesville, Okla.

[21] Appl. No.: 400,186

[22] Filed: Jul. 20, 1982

[51] Int. Cl.³ ............................ C08K 3/40; C08K 5/09; C08L 81/00; C08L 81/04
[52] U.S. Cl. ................................. 524/322; 106/308 F; 501/32; 524/300; 524/609
[58] Field of Search ...................... 524/609, 322, 300; 106/308 F; 501/32

[56] References Cited

U.S. PATENT DOCUMENTS

| | | | |
|---|---|---|---|
| 2,398,998 | 4/1946 | Blake | 524/609 |
| 3,236,929 | 2/1966 | Jupa et al. | 264/328.14 |
| 3,243,403 | 3/1966 | Vondy et al. | 524/609 |
| 3,717,617 | 2/1973 | Marrs et al. | 428/419 |
| 3,759,852 | 9/1973 | Bradley | 106/308 F |
| 3,779,954 | 12/1973 | Wirth et al. | 524/322 |
| 3,894,977 | 7/1975 | Brown et al. | 524/609 |
| 4,176,098 | 11/1979 | Needham | 524/609 |
| 4,191,670 | 3/1980 | Strauch et al. | 106/308 F |
| 4,337,182 | 6/1982 | Needham | 524/609 |
| 4,365,037 | 12/1982 | Adachi et al. | 524/609 |

FOREIGN PATENT DOCUMENTS 1142301  2/1969  United Kingdom ............... 524/609

*Primary Examiner*—Ronald W. Griffin

[57] ABSTRACT

The hydrolytic stability of glass-containing poly(arylene sulfide) compositions can be improved by the addition of a fatty acid such as stearic acid. Optionally, the stearic acid can be employed in combination with certain organosilanes such as N-vinylbenzyl-N-2-(trimethoxysilylpropylamino)ethylammonium chloride or mercaptosilanes.

50 Claims, No Drawings

HYDROLYTIC STABILITY IMPROVING ADDITIVE

BACKGROUND

My invention relates to the improvement of the hydrolytic stability of a glass-containing poly(arylene sulfide) composition.

Glass-containing poly(arylene sulfide) compositions are commonly employed in a myriad of commercial and noncommerical applications such as, for example, appliance components, pumps, valves, automotive under-the-hood components, etc. Many intended applications necessitate contact of the glass-containing poly(arylene sulfide) compositions with water. This contact results in a deleterious interaction between the water and the composition. The water disrupts bonding between poly(arylene sulfide) and glass (and certain other fillers if present) and otherwise reduces the performance level of the composition and adversely affects its utility. The hydrolytic stability of the composition is in effect the ability of the composition to resist water attack and to retain its original properties after prolonged exposure to water. Contact with water can, for example, reduce the tensile strength or flexural strength of the composition. Diminution of these and other desired properties can render the composition less suitable or even useless for its intended purpose. It is, therefore, highly desirable to improve the hydrolytic stability of glass-filled poly(arylene sulfide) compositions to minimize the adverse effects caused by contact with water. The present invention is directed towards this end.

SUMMARY OF THE INVENTION

The hydrolytic stability of a glass-filled poly(arylene sulfide) composition can be improved by the addition of an alkyl carboxylic acid to the composition. The alkyl carboxylic acids of my invention are of the formula R—COOH wherein R is an alkyl radical and wherein R has at least 5 carbon atoms. Hydrolytic stability can be further improved by the further addition of certain organosilanes.

OBJECTS OF THE INVENTION

It is an object of this invention to improve the hydrolytic stability of glass-filled poly(arylene sulfide) compositions.

It is a further object of this invention to improve the ability of glass-filled poly(arylene sulfide) compositions to retain tensile strength after prolonged exposure to water.

These and other objects and advantages will become apparent from a study of this disclosure and the appended claims.

DETAILED DESCRIPTION OF THE INVENTION

The hydrolytic stability of glass-containing poly(arylene sulfide) compositions can be improved by adding a hydrolytic stabilizing amount of a fatty acid to the composition. By further adding certain organosilanes to the composition hydrolytic stability can be further enhanced.

The poly(arylene sulfide) polymers useful in the practice of my invention include, but are not limited to, homopolymers and the normally solid arylene sulfide copolymers, terpolymers and the like having melting or softening points of at least about 300° F. (149° C.) and more preferably from about 400° to about 900° F. (204°-482° C.). Such poly(arylene sulfide) polymers include those described in U.S. Pat. No. 3,354,129 which issued Nov. 21, 1967 to Edmonds and Hill. That patent is incorporated by reference herein.

The presently preferred poly(arylene sulfide) is poly(phenylene sulfide). The presently preferred poly(phenylene sulfide) has a crystalline melting point ranging from about 482° to about 572° F. (250°-300° C.). The type of poly(phenylene sulfide) employed can be molding, film, fiber or any other similar grade. The preferred polymers have inherent viscosities as determined at a polymer concentration of 0.4 g/100 mL solution in 1-chloronaphthalene at 206° C. ranging from about 0.1 to 0.3.

Other suitable poly(arylene sulfides) include, but are not limited to, poly(4,4'-biphenylene sulfide), poly(2,4-tolylene sulfide) and the like.

In the practice of this invention glass-containing poly(arylene sulfide) is used. Because of their reinforcement properties glass fibers are the preferred glass material incorporated into the polymer. In one embodiment of this invention these fibers can range from about 0.1 to about 1 inch in length and from about 5 to about 25 microns in diameter. Glass in other forms such as, for example, beads, powder, particles and the like, can also be used.

Fillers other than glass may be present in the poly(arylene sulfide) so long as their presence does not fully negate the hydrolytic stability improving utility of the carboxylic acid. By way of example, acceptable fillers include mica, talc, calcium carbonate, carbon fibers, silica, clay and titanium dioxide.

The alkyl carboxylic acids useful in the practice of my invention are represented by the formula

wherein R is an alkyl radical and wherein R has at least 5 carbon atoms. Fatty acids falling within the scope of this formula are preferred because the alkyl radicals associated with these fatty acids are linear or nearly linear. Suitable fatty acids include, but are not limited to, capric acid, undecanoic acid, lauric acid, stearic acid and arachidic acid.

Hydrolytic stability can be further enhanced by employing the alkyl carboxylic acid in combination with certain organosilanes such as, for example, N-vinylbenzyl-N-2-(trimethoxysilylpropylamino)ethylammonium chloride or 2-Mercaptoethyltriethoxysilane. Other organosilanes, such as 3-aminopropyltriethoxysilane, have a deleterious effect on hydrolytic stability and do not fall within the scope of this invention. The silanes contemplated to be within the scope of this invention include those organosilanes having a mercapto(—SH) functional group. These mercaptosilanes include the mercaptoalkoxysilanes such as, for example, 3-mercaptopropyltrimethoxysilane and 2-mercaptoethyltriethoxysilane.

The poly(arylene sulfide), the glass, the alkyl crboxylic acid and, optionally, the organosilane can be mixed or blended together in any order and in accordance with any mixing or blending method sufficient to effect the hydrolytic stabilizing utility of the alkyl carboxylic acid. Any of the conventional methods for mixing or blending of plastics and fillers can be used with satisfactory results.

Although this invention is not limited thereto, the following ranges represent the broad and preferred weight percentage ranges of the various components:

|  | Broad Wt. % | Preferred Wt. % |
|---|---|---|
| Poly(arylene sulfide) | 25-80 | 55-65 |
| Fiber glass | 10-60 | 35-45 |
| Fillers | 0-40 | 0-10 |
| Alkyl carboxylic acid | 0.05-4 | 0.1-2 |
| Organosilane | 0-4 | 0-2 |

The given weight percentages are based upon the total composition. The preferred ranges are preferred because they represent the presently contemplated best use of the components. It is emphasized that these figures do not define the outermost boundaries of my invention. The amount of alkyl carboxylic acid employed can be any finite amount sufficient to improve the hydrolytic stability of the glass-containing poly(arylene sulfide) composition. If it is desired to also use an organosilane then any finite amount of that organosilane sufficient to further enhance the hydrolytic stability of the composition is within the scope of my invention.

It is further noted that mixtures of more than one organosilane and mixtures of more than one alkyl carboxylic acid are also within the scope of my invention as disclosed herein and defined in the appended claims. When such mixtures are employed the weight percentage ranges given above are intended to reflect the total organosilane or total alkyl carboxylic acid content of the composition.

The compositions of this invention can be extruded at a temperature of at least about the melting point of the poly(arylene sulfide) to produce a composition of improved hydrolytic stability.

Examples are provided to better illustrate my invention and to set forth the presently contemplated best mode of operation. They should not be interpreted to unduly limit the scope of this invention as defined in the claims.

EXAMPLE I

This examples serves as a control and describes the procedure used to prepare and test the samples. The typical method of preparation was as follows: 800 grams of 0.125 inch milled glass fibers (Owens-Corning) and 1200 grams of poly(phenylene sulfide) (flow rate=120 g/10 min. ASTM D1238 Procedure B modified to use a 5 Kg weight at 600° F.) were tumble mixed together for about 5 to 10 minutes. The mixture was extruded through a Davis Standard Standard extruder at 600° F. (316° C.); ground into a granular or coarse powder; dried in a 350° F. (177° C.) oven for 3 hours; and molded using a New Britain molding machine (barrel 600° F., mold 275° F.) into bar specimens, 8 inches × 1 inch × 0.125 inch. The bars (generally 3 per set) were immersed in distilled water in a pressure cooker at 120° C. and 15 psig for a total of 130 hours, cooled, dried in an oven for a few hours at 110° C., conditioned overnight at room temperature and evaluated. Tensile strengths were determined in accordance with test method ASTM D882-56T. The average tensile strengths before and after water boil treatment were 69.1 MPa and 48.8 MPa respectively with a percentage loss value of 29.4. The tensile strength differential provides a good indication of hydrolytic stability. The greater the percentage loss the poorer the hydrolytic stability of the sample. Accordingly, a low percentage loss, indicative of good hydrolytic stability, is desired.

EXAMPLE II

This control example demonstrates the hydrolytic stabilizing utility of an organosilane. The procedure described in Example I was repeated except the glass fibers were pretreated with 16 grams (0.8 wt. percent based on total wt.) of 3-aminopropyltriethoxysilane (A-1100 from Union-Carbide) in a Welex Blender for 5 minutes before tumble mixing with the poly(phenylene sulfide). The average tensile strength before and after water treatment at 120° C. and 15 psig for 130 hours was 73.8 MPa and 65.8 MPa respectively with a percentage loss value of 10.8. As compared to the result in Example I the lower percentage loss in tensile strength after hot water exposure evidences the increased hydrolytic stability of the organosilane containing samples.

EXAMPLE III

This example illustrates the invention and demonstrates that when a fatty acid like stearic acid is used in place of the organosilane of Example II, hydrolytic stability is improved. The procedure used in Example I was repeated except 20 grams (1 wt. percent based on total composition) of powdered stearic acid was added to the mixture before tumble mixing. The results are listed in Table I along with those of Examples I and II. It can be seen that, of the three examples, the lowest percentage loss value is associated with stearic acid. It therefore follows that stearic acid was better able to improve the hydrolytic stability of the glass-containing poly(phenylene sulfide) composition than the organosilane.

TABLE I

| Hydrolytic Stability of Poly(phenylene Sulfide) Compositions | | | |
|---|---|---|---|
| Composition | 1200 grams Poly(phenylene Sulfide) 800 grams Glass Fibers | | |
| Exposure | 130 hrs., 120° C., 15 psig | | |
|  | Tensile Strength, MPa | | |
|  | Before | After | % Loss[a] |
| Control |  |  |  |
| 1. no additive | 69.1 | 48.8 | 29.4 |
| 2. 0.8 wt. % 3-Aminopropyltri-ethoxysilane | 73.8 | 65.8 | 10.8 |
| Invention |  |  |  |
| 3. 1.0 wt. % stearic acid | 44.5 | 41.8 | 6.1 |

[a] after water exposure.

EXAMPLE IV

This example illustrates the invention and demonstrates that a combination of stearic acid with a certain organosilane greatly improves the hydrolytic stability of glass-containing poly(phenylene sulfide) compositions. The procedure used in Example I was repeated except 8 grams of Z6032, a 40 percent solution of N-vinylbenzyl-N-2-(trimethoxysilylpropylamino)ethylammonium chloride in methanol, was mixed with the glass fibers in a Welex mixer for 5 minutes and 10 grams of powdered stearic acid was tumble mixed with the glass fiber-silane mixture and the poly(phenylene sulfide). Sample preparation and testing were the same as previously described except the bars were immersed in water at 120° C. and 15 psig for 150 hours. The results, which are listed in Table II along with another set of controls run at the same time, show that the combination of the organosilane-stearic acid greatly reduced performance property loss, i.e., percentage loss after water exposure.

TABLE II

Effect of an Organosilane-Stearic Acid Blend on the Hydrolytic Stability of Glass-Containing Poly(phenylene sulfide) Compositions

| Composition | 1200 grams Polyphenylene Sulfide 800 grams Glass Fibers | | |
|---|---|---|---|
| Exposure | 150 hrs., 120° C., 15 psig. | | |
| | Tensile Strength MPa | | |
| | Before | After | % Loss[a] |
| Controls | | | |
| 1. no additive | 48.1 | 35.6 | 26.0 |
| 2. 0.8 wt. % Z6032 (Organosilane)[b] | 59.3 | 54.4 | 8.3 |
| Invention | | | |
| 3. 0.3 wt. % Z6032 to 5 wt. % Stearic Acid | 51.5 | 49.9 | 3.1 |

[a]After 150 hrs. water exposure.
[b]A 40% Methanol solution of N—vinyl-benzyl-N—2-(trimethoxysilyl-propylamino)ethylammonium chloride available from Dow Corning.

EXAMPLE V

This control example illustrates that not all organosilane-stearic acid blends improve the hydrolytic stability of glass-containing poly(phenylene sulfide) compositions. The procedure described in Example IV was repeated except 8 grams (0.4 wt. percent based on total composition) of 3-aminopropyltriethoxysilane (A-1100 available from Union carbide) and 10 grams of powdered stearic acid were added to the composition. The results show tensile strengths of 57.7 MPa and 45.6 MPa before and after 150 hour, 120° C., 15 psig water exposure. This represents a 21 percent loss in tensile strength. Control samples containing neither the organosilane nor the stearic acid were also tested. The average tensile strengths for the control samples were 58.6 MPa before and 48.7 MPa after water treatment indicating a 16.9 percent performance loss. The lower percent loss corresponding to the control shows that the combination of aminopropyltriethoxysilanes and stearic acid was detrimental rather than beneficial in terms of hydrolytic stability.

SUMMARY OF EXAMPLES I, II, III, IV and V

For the convenience of comparison the data in the preceding tables are normalized by averaging the three controls from each table and proportionating each individual silane and/or stearic acid-containing composition value in each table relative to the control in each table and relative to the average control value. This data, presented in Table III, indicates that stearic acid improves the hydrolytic stability of glass-containing poly(phenylene sulfide) better than the two individual organosilanes tested. The data also suggest further improvement of hydrolytic stability when certain organosilanes are employed in combination with stearic acid.

TABLE III

Summary
1200 grams Poly(phenylene Sulfide)
800 grams Glass Fibers

| Example | Additive | Normalized % Loss in Tensile Strength After 130-150 Hrs/120° C./15 psig Water Exposure |
|---|---|---|
| Controls | | |
| I | No additive | 24.2 |
| V | .4% A-1100[a] + .5% Stearic Acid | 30.1 |
| II | .8% A-1100 | 8.9 |
| IV | .8% Z6032[b] | 7.7 |
| Invention | | |
| III | 1.0% Stearic Acid | 5.0 |
| IV | .5% Stearic Acid + .8% Z6032 | 2.9 |

[a]3-Aminopropyltriethoxysilane from Union Carbide.
[b]40 Wt. % Methanol solution of N—vinylbenzyl-N—2-(trimethoxysilyl-propylamino)ethylammonium chloride from Dow Corning.

EXAMPLE VI

This example compares three different organosilanes alone and in combination with stearic acid. The experimental procedure set forth in Examples II and IV was followed except as modified below.

All of the samples contained 1200 g of poly(phenylene sulfide) and 800 g of glass fiber. The composition of each sample additionally contained the following:

| Sample | | |
|---|---|---|
| A | | 16 g vinyl-tris(2-methoxyethoxysilane)[a] |
| B | | 16 g vinyl-tris(2-methoxyethoxysilane)[a] 10 g stearic acid |
| C | | 16 g aminophenylsilane[b] |
| D | | 16 g aminophenylsilane[b] 10 g stearic acid |
| E | | 16 g 2-mercaptoethyltriethoxysilane[c] |
| F | | 16 g 2-mercaptoethyltriethoxysilane[c] 10 g stearic acid |
| G | (control) | (none) |

[a]A-172 Union Carbide
[b]Kay-Fries Co.
[c]A-1893 Union Carbide

The tensile strengths both before and after water exposure (150 hours at 120° C. and 15 psi) were determined and are presented in Table IV.

TABLE IV

| | Tensile Strength, MPa | | |
|---|---|---|---|
| Sample | Before | After | % Loss |
| A | 68.6 | 67.4 | 1.7 |
| B | 65.8 | 61.1 | 7.1 |
| C | 65.6 | 56.4 | 14.0 |
| D | 68.3 | 50.0 | 26.8 |
| E | 61.7 | 56.2 | 8.9 |
| F | 59.5 | 55.1 | 7.4 |
| G | 55.8 | 44.1 | 21.0 |

The data shown that the combination of stearic acid and vinyltris(2-methoxyethoxysilane) (sample B) was better, in terms of hydrolytic stability, than the control (sample G). The combination of stearic acid and aminophenylsilane (sample D) produced results even more undesirable than the control (sample G). Sample F shows that the combination of 2-mercaptoethyltriethoxysilane and stearic acid produced results better than the organosilane alone (sample E) and the control (sample G).

I have attempted in the specification to make a full and complete disclosure of my invention to the public.

The essence of this invention resides in the use of alkyl carboxylic acids, especially fatty acids, alone or in combination with certain organosilanes, to improve the hydrolytic stability of glass-containing poly(arylene sulfide) compositions.

Reasonable variations from and modifications of my invention as described herein are contemplated to be within the scope of patent protection desired and sought.

I claim:

1. A composition comprising (a) poly(arylene sulfide), (b) glass and (c) alkyl carboxylic acid represented by the formula R—COOH wherein R is an alkyl radical and wherein R has at least 5 carbon atoms.

2. A composition in accordance with claim 1 wherein said alkyl carboxylic acid is fatty acid.

3. A composition in accordance with claim 2 wherein said glass is in the form of glass fibers.

4. A composition in accordance with claim 1 wherein said poly(arylene sulfide) is poly(phenylene sulfide).

5. A composition in accordance with claim 4 wherein said alkyl carboxylic acid is fatty acid, wherein the amount of said fatty acid ranges from about 0.05 to about 4 weight percent based upon total composition; wherein the amount of said poly(phenylene sulfide) ranges from about 25 to about 80 weight percent based upon total compositions; and wherein said reinforcing agent is glass in the form of glass fibers and the amount of said glass ranges from about 10 to about 60 weight percent based upon total composition.

6. A composition in accordance with claim 5 wherein said weight percent of said fatty acid ranges from about 0.1 to about 2; wherein said weight percentage of said poly(phenylene sulfide) ranges from about 55 to about 65; and wherein said weight percentage of said glass ranges from about 35 to about 45.

7. A composition in accordance with claim 3, 4, or 6 wherein said fatty acid is capric acid.

8. A composition in accordance with claim 3, 4, or 6 wherein said fatty acid is undecanoic acid.

9. A composition in accordance with claim 3, 4 or 6 wherein said fatty acid is lauric acid.

10. A composition in accordance with claim 3, 4, or 6 wherein said fatty acid is stearic acid.

11. A composition in accordance with claim 3, 4, or 6 wherein said fatty acid is arachidic acid.

12. A composition in accordance with claim 1, 2, 4 or 5 further comprising N-vinylbenzyl-N-2-(trimethoxysilylpropylamino)ethylammonium chloride.

13. A composition in accordance with claim 1, 2, 4 or 5 further comprising organosilane having a mercapto functional group —SH.

14. A composition in accordance with claim 13 wherein said organosilane is a mercaptoalkoxysilane.

15. A composition in accordance with claim 14 wherein said mercaptoalkoxysilane is 3-mercaptopropyltrimethoxysilane.

16. A composition in accordance with claim 14 wherein said mercaptoalkoxysilane is 2-mercaptoethyltriethoxysilane.

17. A composition in accordance with claim 14 wherein the amount of said organosilane is not more than about 4 weight percent based upon total composition.

18. A method comprising producing a mixture by combining poly(arylene sulfide), glass and alkyl carboxylic acid represented by the formula R—COOH wherein R is an alkyl radical and wherein R has at least 5 carbon atoms.

19. A method in accordance with claim 18 furher comprising heating said mixture to a temperature of at least about the melting point of said poly(arylene sulfide).

20. A method in accordance with claim 19 wherein said mixture is extruded at said temperature.

21. A method in accordance with claim 19 or 20 wherein the alkyl carboxylic acid is a fatty acid.

22. A method in accordance with claim 21 wherein said fatty acid is stearic acid.

23. A method in accordance with claim 19 wherein said poly(arylene sulfide) is poly(phenylene sulfide).

24. A method in accordance with claim 22 wherein said poly(arylene sulfide) is poly(phenylene sulfide).

25. A method in accordance with claim 23 wherein the amount of said fatty acid ranges from about 0.05 to about 4 weight percent based upon total composition.

26. A method in accordance with claim 21 wherein said mixture further comprises N-vinylbenzyl-N-2-(trimethoxysilylpropylamino)ethylammonium chloride.

27. A method in accordance with claim 26 wherein said poly(arylene sulfide) is poly(phenylene sulfide) and the amount of said fatty acid ranges from about 0.05 to about 4 weight percent based upon total composition.

28. A method in accordance with claim 19 wherein said mixture further comprises an organosilane having a mercapto functional group —SH.

29. A method in accordance with claim 28 wherein said poly(arylene sulfide) is polyphenylene sulfide.

30. A method in accordance with claim 29 wherein said organosilane is a mecaptoalkoxysilane.

31. A method in accordance with claim 29 wherein said mercaptoalkoxysilane is 3-mercaptopropyltrimethoxysilane.

32. A method in accordance with claim 29 wherein said mercaptoalkoxysilane is 2-mercaptoethyltriethoxysilane.

33. A method in accordance with claim 29 wherein the amount of said organosilane is not more than about 4 weight percent based upon total composition and said alkyl carboxylic acid is a fatty acid.

34. The composition produced in accordance with the method of claim 19.

35. The composition produced in accordance with the method of claim 20.

36. The composition produced in accordance with the method of claim 21.

37. The composition produced in accordance with the method of claim 22.

38. The composition produced in accordance with the method of claim 23.

39. The composition produced in accordance with the method of claim 24.

40. The composition produced in accordance with the method of claim 25.

41. The composition produced in accordance with the method of claim 26.

42. The composition produced in accordance with the method of claim 27.

43. The composition produced in accordance with the method of claim 28.

44. The composition produced in accordance with the method of claim 29.

45. The composition produced in accordance with the method of claim 30.

46. The composition produced in accordance with the method of claim 31.

47. The composition produced in accordance with the method of claim 32.

48. The composition produced in accordance with the method of claim 33.

49. A composition consisting essentially of (a) poly(arylene sulfide), (b) glass and (c) alkyl carboxylic acid represented by the formula R—COOH where R is an alkyl radical and wherein R has at least 5 carbon atoms.

50. A composition according to claim 49 wherein said poly(arylene sulfide) is poly(phenylene sulfide); wherein said glass is in the form of glass fibers; wherein said alkyl carboxylic acid is a fatty acid; wherein the amount of said fatty acid ranges from about 0.05 to about 4 weight percent; wherein the amount of said poly(phenylene sulfide) ranges from about 25 to about 80 weight percent; wherein the amount of said glass fibers range from about 10 to about 60 weight percent; and wherein said weight percentages are based upon total composition.

* * * * *